United States Patent
McGrew

(10) Patent No.: US 8,139,103 B2
(45) Date of Patent: Mar. 20, 2012

(54) TRAVELING LENS FOR VIDEO DISPLAY

(75) Inventor: Stephen Paul McGrew, Spokane, WA (US)

(73) Assignee: Vuzix Corporation, Rochester, NY (US)

( * ) Notice: Subject to any disclaimer, the term of this patent is extended or adjusted under 35 U.S.C. 154(b) by 1166 days.

(21) Appl. No.: 11/938,038

(22) Filed: Nov. 9, 2007

(65) Prior Publication Data

US 2008/0117341 A1   May 22, 2008

Related U.S. Application Data

(60) Provisional application No. 60/865,406, filed on Nov. 11, 2006, provisional application No. 60/896,903, filed on Mar. 24, 2007.

(51) Int. Cl.
*G03H 1/00* (2006.01)
*H04N 13/00* (2006.01)
*G09G 5/00* (2006.01)

(52) U.S. Cl. .................. 348/40; 348/41; 359/14; 345/7

(58) Field of Classification Search ............. 348/40–41; 359/1, 13–14; 345/7–9
See application file for complete search history.

(56) References Cited

U.S. PATENT DOCUMENTS

| | | | | |
|---|---|---|---|---|
| 4,063,226 A * | 12/1977 | Kozma et al. | ................. | 365/125 |
| 4,115,747 A | 9/1978 | Sato et al. | | |
| 4,216,440 A * | 8/1980 | Rahn et al. | ...................... | 372/20 |
| 4,992,880 A | 2/1991 | Trias | | |
| 5,115,344 A | 5/1992 | Jaskie | | |
| 5,151,800 A * | 9/1992 | Upatnieks | ........................ | 359/14 |
| 5,303,043 A * | 4/1994 | Glenn | .............................. | 348/40 |
| 5,341,230 A * | 8/1994 | Smith | ............................. | 359/13 |
| 5,410,371 A * | 4/1995 | Lambert | ....................... | 348/769 |
| 5,412,501 A * | 5/1995 | Fisli | ............................. | 359/286 |
| 5,801,874 A | 9/1998 | Montgomery et al. | | |
| 5,973,727 A | 10/1999 | McGrew et al. | | |
| 6,043,924 A | 3/2000 | Montegomery et al. | | |
| 6,052,215 A | 4/2000 | Montgomery et al. | | |
| 6,181,367 B1 | 1/2001 | McGrew et al. | | |
| 6,243,199 B1 | 6/2001 | Hansen et al. | | |
| 6,473,238 B1 | 10/2002 | Daniell | | |
| 6,538,690 B1 | 3/2003 | Montgomery et al. | | |
| 6,975,765 B2 | 12/2005 | McGrew et al. | | |
| 7,286,272 B2 * | 10/2007 | Mukawa | ......................... | 359/13 |
| 2002/0031291 A1 | 3/2002 | Montgomery et al. | | |
| 2004/0190573 A1 | 9/2004 | Krushcwitz et al. | | |

(Continued)

OTHER PUBLICATIONS

P. Hands et al., "Adaptive modally addressed liquid crystal lenses", Liquid Crystals VIII. Edited by Khoo, Iam-Choon. Proceedings of the SPIE, vol. 5518, pp. 136-143 (2004).

(Continued)

*Primary Examiner* — Brendan Higa
(74) *Attorney, Agent, or Firm* — Stephen B. Salai, Esq.; Thomas B. Ryan, Patent Agent; Harter Secrest & Emery LLP

(57) ABSTRACT

A video display includes a light signal generator that generates modulated light signals containing video information propagating along an optical guideway. A light-releasing mechanism releases light from the optical guideway in a timed relationship with the modulation of the light signals. A traveling lens propagates in communication with an optical guideway for guiding light released from the optical guideway into selected directions in a timed relationship with a modulation of the light signals.

11 Claims, 4 Drawing Sheets with uniform traveling grating

U.S. PATENT DOCUMENTS

| | | | |
|---|---|---|---|
| 2004/0218390 | A1 | 11/2004 | Holman et al. |
| 2005/0264813 | A1 | 12/2005 | Giakos |
| 2006/0139710 | A1* | 6/2006 | Schwerdtner ............ 359/9 |
| 2006/0215244 | A1 | 9/2006 | Yosha et al. |
| 2006/0268241 | A1 | 11/2006 | Watson et al. |
| 2006/0280219 | A1 | 12/2006 | Shchegrov |
| 2006/0290899 | A1 | 12/2006 | Davis et al. |
| 2008/0225921 | A1* | 9/2008 | Kuss et al. ............ 372/57 |
| 2009/0040294 | A1* | 2/2009 | Smalley et al. ......... 348/40 |
| 2010/0067075 | A1* | 3/2010 | Schwerdtner ............ 359/9 |

OTHER PUBLICATIONS

A. Naumov et al., "Liquid-crystal adaptive lenses with modal control," Optics Letters 23, 992-994 (1998).

A. Naumov, et al., "Control optimization of spherical modal liquid crystal lenses" Optics Express, vol. 4, Issue 9, pp. 344-352.

M. Loktev, et al., "Wave front control systems based on modal liquid crystal lenses" Review of Scientific Instruments, vol. 71, Issue 9, pp. 3290-3297 (2000).

R. H. Johnson and R. M. Montgomery, "Optical beam deflection using acoustic-traveling wave technology" published in Proc. SPIE, Acousto-Optics/Instrumentation/ Applications, vol. 90, p. 43, Aug. 1976.

L. Onural et al., "New high-resolution display device for holographic three dimensional video: principles and simulations" in Optical Engineering/Mar. 1994 vol. 33 No. 3/ p. 835.

Smalley et al., MIT Media Lab in the MTL Annual Research report Sep. 2006.

A. Zhang et al., "Integrated liquid crystal optical switch based on total internal reflection", Applied Physics Letters 86, 211108, 2005 American Institute of Physics.

B. Maune et al., "Liquid-crystal electric tuning of a photonic crystal laser", Applied Physics Letters, Jul. 19, 2004, vol. 85, No. 3, 2004 American Institute of Physics, pp. 360-362.

O. A. Zayakin et al., "Cylindrical adaptive lenses".

Hustson, Stu, "Smart glasses switch focus in an instant", Newscientisttech.com, Apr. 3, 2006.

Zhang et al. "Integrated liquid crystal optical switch based on total internal reflection", Applied Physics Letters 86, 211108, 2005.

H. Ren et al. "In-plane switching liquid crystal gel for polarization-independent light switch",Journal of Applied Physics, Vo. 96, No. 7, Oct. 1, 2004.

Xu et al., "Wire-grid diffraction gratings used as polarizing beam splitter for visible light and applied in liquid crystal on silicon", Optics Express, Apr. 4, 2005, vol. 13, No. 7, pp. 2303-2320.

Jepsen et al., "Liquid-crystal-filled gratings with high diffraction efficiency", Optic Letters, Jul. 15, 1996, vol. 21, No. 14, pp. 1081-1083.

Beiser, Leo, "Scanner Devices and Technology", Unified Optical Scanning Technology, Published Online: Jan. 28, 2005, John Wiley & Sons, Inc. Chapter 4, pp. 122-126.

\* cited by examiner with uniform traveling grating with traveling collimator lens traveling lens used also as eye tracker
(with "off-axis" collimating lens)

traveling grating used also as eye tracker
(by adjusting acoustic wavelength)

Moving the virtual image closer

Moving the virtual image closer

TRAVELING LENS FOR VIDEO DISPLAY

BACKGROUND OF THE INVENTION

A video display described in U.S. Pat. Nos. 6,181,367 and 5,973,727 to McGrew et al., both of which are hereby incorporated by reference, uses a liquid crystal layer to switch totally internally reflected (TIR) light out of a plate at individual display rows. Activating strip electrodes alter the refractive index of the liquid crystal layer along individual display rows in a timed sequence with an image generating display signal injected endwise into the plate. A separate optical element focuses the switched-out light onto the pupil of the user's eye.

This approach has some shortcomings. First, the vertical eyebox is quite limited. Second, troublesome vertical diffraction of the switched-out image light can occur through narrow individual display rows. An object of the present invention is to solve these problems by using a traveling lens to direct light from multiple rows in the display into a vertically collimated beam directed toward the user's eye. A beam steerer may be considered to be a special case of a traveling lens, in which the traveling lens has an infinite focal length and a variable-direction axis.

Any device that can actively redirect a beam of light can be considered a beam steerer. An ordinary diffractive or refractive lens redirects light passively, with the angle of redirection varying continuously across the lens. A variable-focus lens, though, could be considered a crude type of beam steerer because the angle of redirection at any point would be actively controlled as the focus is varied. A movable lens, movable prism, or deformable mirror could similarly be considered to be a beam steerer. Another implementation of an active optical element to serve as a beam steerer or traveling lens would be an acoustically or otherwise generated diffractive optical element.

Several different physical phenomena can be used to implement a traveling lens or beam steerer in this display. The electric field across a liquid crystal layer can control the effective refractive index of the liquid crystal, so spatially varying electric field produces a spatially varying optical thickness that can function as a lens or as a prism. An acoustic wave train in a solid or liquid can act as a diffraction grating (effectively a prism) or as a diffractive lens depending on the shape and frequency of the wavefronts. An acousto-optic diffraction grating results from an acoustic wave of constant frequency, while an acousto-optic lens results from an acoustic wave with a frequency that varies approximately quadratically with respect to time. The refractive index of a photorefractive material depends on the intensity of light impinging on the material, so a photorefractive lens can be generated by illuminating a plate of photorefractive material with a light beam whose intensity varies approximately quadratically with respect to position on the plate. An acoustic wave in a liquid crystal material affects the refractive index of the material, so a prism or lens can be created in liquid crystal layer by passing an acoustic wave through the layer with appropriately controlled frequency "chirp": a prism would have no chirp, whereas a lens would have a quadratic chip. A high-intensity acousto-optic wave in a medium like water or silica can act like a traveling array of lenses, where each wave cycle acts like a single lenslet.

According to the present invention, the vertical eyebox of the display that is the subject of U.S. Pat. Nos. 6,181,367 and 5,973,727 can be widened by generating a traveling lens that moves vertically across the display. The traveling lens preferably directs light (corresponding to one row of image pixels) out from a relatively wide band of display rows as a quasi-collimated beam approaching a user's eye to form a virtual image of the row of image pixels (preferably at infinity). The vertical eyebox could then be as wide as the band of display rows. In this case, light coupled out of a TIR (total internal reflection) mode in the plate can be directed into any direction desired, then redirected by the traveling lens. For example, light can be coupled out of the TIR plate by a low-efficiency linear diffraction grating into a collimated beam (for each LED light source) propagating perpendicular (with respect to the vertical direction) to the plate's surface; then a beam steerer can direct the collimated beam to the eyebox. Alternatively, light can be coupled out of the TIR plate by a diffractive element such as an HOE (holographic optical element) or an acoustic wave pattern, to focus to a line at the eyebox, and a traveling lens can collimate a portion of the light into the eyebox.

Also according to the present invention, it is possible to eliminate unwanted diffraction from liquid crystal electrodes and from narrow shutter slits by use of the traveling lens. If the traveling lens has effectively infinite focal length, it is essentially a variable prism. In that case, the width of the band of display rows used to display each image row instantaneously can be the full height of the display. The entire display would emit light into one vertical angle as a collimated beam, and the angle would sweep approximately 30 times per second through its full range. As the angle sweeps, the power of the LEDs producing the light beam is modulated synchronously with the sweep so that the image information in the beam corresponds at each moment to the vertical angle of the redirected beam. An eye in the eyebox will perceive a two-dimensional image. If a different image from a stereo pair is presented to each eye, a 3D image can be perceived.

The traveling lens can be implemented in many different ways. One way is to place a layer of liquid crystal between two arrays of electrodes. For any one polarization axis, the refractive index depends on the electric field in the liquid crystal layer. For convenience, the direction perpendicular to the layer of liquid crystal can be called the Z direction, the vertical direction can be called the Y direction, and the horizontal direction can be called the X direction. When voltages are applied to the electrodes to create an electric field in the Z direction that varies approximately quadratically with X, Y, or both, the liquid crystal layer will act as a lens. If the coefficient of the quadratic term goes to zero and the coefficient of the linear term stays finite so that the focal length of the lens goes to zero but the refractive index varies linearly with respect to X or Y (or both) the liquid crystal layer will act as a prism, with the effective wedge angle of the prism depending on the coefficient of the linear term.

If the wedge angle of a prism varies with time, a light beam passing through the prism will be deflected by an angle depending on the wedge angle. So, the liquid crystal device can act as a beam steerer.

If the focal length of a lens varies with time, it can serve as an adaptive lens. If the center of its curvature moves in the X or Y direction (or both) but the focal length stays constant, the lens is a simple traveling lens. This may be accomplished by varying voltages in the liquid crystal device as follows: let the voltage across the liquid crystal layer be V, such that $V=V_0+a'(X-x')+b'(Y+y')+c'(X-x')^2+d'(X-x')(Y-y')^2+e'(Y-y')^2$. Now vary x' or y' (or both) as a function of time so that $x'=x'(t)$ and $y'=y'(t)$. In effect this moves the lens axis to new positions $(x',y')=(x'(t),y'(t))$. If x' and y' vary linearly with time, the lens will move at a constant velocity.

Of course, because liquid crystals respond nonlinearly to an applied electric field, the ideal voltage profile also will be nonlinear. Similarly, the dynamic response of a liquid crystal layer depends on various factors including the rate of change of the applied voltage, the composition of the liquid crystal material, the temperature of the liquid crystal, and the impedance, capacitance and geometry of the electrodes. Accordingly, in order to generate a high quality liquid crystal traveling lens that moves fast or a liquid crystal prism that can deflect a light beam rapidly without distortion, it is necessary to take the nonlinearities and the dynamics into account and pre-compensate for the expected distortion.

Some researchers have developed "modal" variable focal length liquid crystal lenses (see reference immediately below), in which an AC radio-frequency voltage produces a DC lens. Typically, these lenses are generated by a high resistivity disk-shaped electrode in electrical contact with a surrounding low-resistivity electrode. Varying the frequency and amplitude of the applied AC voltage results in a changing focal length lens. It is possible to accomplish a very similar effect with an AC-driven electrode array. Details of such lenses are discussed in a paper entitled "Adaptive modally addressed liquid crystal lenses" by Philip J. W. Hands, Andrew K. Kirby, and Gordon D. Love in Liquid Crystals VIII. Edited by Khoo, Iam-Choon. Proceedings of the SPIE, Volume 5518, pp. 136-143 (2004), which is hereby incorporated by reference. Other adaptive optics useful for purposes of this invention are discussed in the following papers: "Liquid-crystal adaptive lenses with modal control," by A. F. Naumov, M. Y. Loktev, I. R. Guralnik, and G. Vdovin, in Optics Letters 23, 992-994 (1998); "Control optimization of spherical modal liquid crystal lenses" by A. Naumov, Gordon Love, M. Yu. Loktev, and F. Vladimirov in Optics Express, Vol. 4, Issue 9, pp. 344-352; and "Wave front control systems based on modal liquid crystal lenses" by Loktev, M. Yu.; Belopukhov, V. N.; Vladimirov, F. L.; Vdovin, G. V.; Love, G. D.; Naumov, A. F. Review of Scientific Instruments, Volume 71, Issue 9, pp. 3290-3297 (2000), all of which are incorporated by reference.

One method for optimizing the shape of the driving signal is to use a genetic algorithm. For example, the shape of the driving signal could be controlled by a set of variable resistors in an RC or RLC circuit. The genetic algorithm could treat the values of the resistors as "genes" in a "chromosome", and treat the measured performance of the traveling lens or beam steerer as the "fitness", to find an optimum set of resistor values via Darwinian evolution. The use of genetic algorithms for optimizing multiple—parameter systems is well known.

Another way to implement the traveling lens or beam steerer is as an acoustic diffractive element. Previous work with acoustic traveling lenses has been documented by R. H. Johnson and R. M. Montgomery in a paper entitled "Optical beam deflection using acoustic-traveling wave technology" published in Proc. SPIE, Acousto-Optics/Instrumentation/Applications, Vol. 90, p. 43, Aug. 1976. The paper describes a traveling acoustic wave device for use as a document scanner, in which a "chirped" acoustic signal serves as a diffractive lens.

L. Onural, G. Bozdagi, and Abdulla Atalar describe an electronically generated instantaneous hologram in an article entitled "New high-resolution display device for holographic three dimensional video: principles and simulations" in Optical Engineering/March 1994 Vol. 33 No. 3/p. 835. The hologram is in the form of a pattern of surface acoustic waves, which diffracts light to form an image that can be three-dimensional and can contain both horizontal and vertical parallax.

A related device is described by Smalley, Bove, and Smithwick at MIT Media Lab in the MTL Annual Research report September 2006. The device uses guided acoustic waves interacting with total internally reflected light to create a 3D instantaneous hologram having only horizontal parallax. The acoustic waves diffract light out of the total internally reflected mode and into air to form the image.

Other examples of acoustic traveling wave lenses along with their control systems are disclosed in U.S. Pat. Nos. 6,043,924; 6,052,215; and 6,538,690, to Montgomery et al., which are all hereby incorporated by reference.

It is known that an ultrasonic acoustic wave can alter the optical properties of a liquid crystal layer, so it is possible to form an optically diffractive structure by propagating high-frequency acoustic waves through a liquid crystal layer. The frequency of the acoustic waves would have to be selected so that the wavelength of the acoustic waves in the liquid crystal medium (or at the interface between the liquid crystal layer and an adjacent medium) is comparable to the wavelength of the light that is to be controlled by the device.

SUMMARY OF THE INVENTION

The present invention in one or more of its preferred embodiments uses an acousto-optic traveling-wave lens for a different purpose and in a different way than in the prior art applications. For example, the lens can be used as a cylindrical collimating lens that travels across the face of a plate in which carefully structured light is total internally reflected. The traveling-wave lens couples light out of the total internally reflected mode but does not impose any image information onto the light. Instead, it acts as a simple (but moving) cylindrical lens.

Acoustic waves propagate at speeds typically in the range from 1500 meters/sec to 6500 meters/sec. Light can propagate inside a total internal reflection (TIR) plate at angles of incidence ranging from 45 degrees to 57 degrees to the surface normal. For purposes of diffracting light out of the TIR plate, the propagating acoustic wave preferably has a spatial frequency comparable to one acoustic wavelength per 0.7 micron. For example, traveling at 1500 meters/sec., an acoustic frequency of approximately 2 GHz is necessary to achieve the desired acoustic wavelength.

For example, the acoustic wave can traverse the surface of a TIR plate that is 6 centimeters high, in approximately 40 microseconds. A typical video frame rate is 30 frames per second, or up to 90 per second if Red, Green, and Blue (RGB) frames are interleaved. Thus, the acoustic wave will traverse the TIR plate as often as 800 times for each typical RGB frame.

In order to display a video frame rate image where each frame has 1000 rows of image pixels, the LED array (see U.S. Pat. No. 6,181,367) would need to modulate the pixel brightness for each row at intervals of approximately 40 nanoseconds. This is easily achievable with existing LED driving technology. A practical display can use a driver that stores pixel brightness information in a fast buffer array so that brightness information for each pixel row can be fed in parallel fashion to the row of LEDs corresponding to the pixels. The buffer would cycle through an entire set of image rows 800 times per video frame.

The display system is expected to be up to 1000 times faster than typical liquid crystal displays, and is therefore especially applicable to high speed image processing, optical computing, and other demanding applications.

Preferably, the acoustic waves are surface acoustic waves, but they can also be bulk waves, surface waves, shear waves, and so on. The acoustic waves preferably travel on the surface of the TIR plate, but can travel within the bulk of the TIR plate. As is known in the art of acoustic wave devices, the speed and attenuation of the acoustic wave is dependent upon the properties and the structure of the medium in which or on which the wave propagates.

A curved TIR plate can be made by holding a thin glass plate under tension in a cylindrical or nominally cylindrical shape, by thermally forming class into a similar cylindrical shape, by casting the plate in plastic, or by any other method that produces a smooth surface and a volume having uniform or controlled stress, density, refractive index, and other physical properties that may affect the propagation of acoustic or optical waves. Preferably, the plate is made of cast polycarbonate.

BRIEF DESCRIPTION OF THE DRAWING FIGURES

FIG. 1 illustrates a curved TIR plate with a uniform pitch traveling wave diffraction grating and shows the effect of a constant-wavelength acoustic wave pulse propagating around a curved surface on a TIR plate. The constant wavelength results in diffracting the escaping light at the same angle of diffraction with respect to the surface of the plate, which is shown here as a direction perpendicular to the surface. Following the curvature of the plate, all of the light converges to a line focus at the center of curvature (i.e., the rays come to a focus). In this case, the eye would perceive a vertically blurred line of pixels at infinity.

FIG. 2 illustrates a curved TIR plate with a variable pitch traveling wave chirped diffractive collimator lens and shows the effect of a chirped acoustic wave pulse propagating around a similarly curved surface on a TIR plate. The chirped pulse can be achieved by modulating a constant-wavelength acoustic pulse, referred to as a carrier wave. The variable wavelength at each point in the chirped pulse diffracts the light through a range of diffraction angles with respect to the surface of the plate in directions that remain parallel to a central ray emitted at the center of the propagating pulse (i.e., the rays emitted throughout the length of the pulse are collimated). In this case, the eye will perceive a row of pixels at infinity, which are not blurred.

Figure 5:
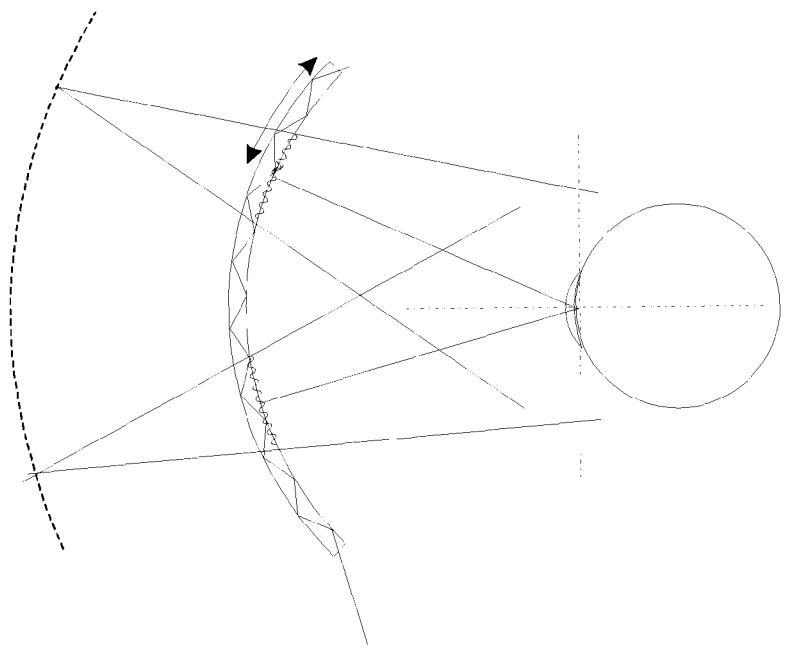

FIG. 5 illustrates a curved TIR plate with a variable pitch traveling wave chirped diffractive lens and shows how, by varying the chirp of the acoustic wave pulse, the effective position of the virtual image can be adjusted. Diverging rays correspond to a closer virtual image. That is, shortening the focal length of the traveling lens brings the virtual image plane in closer.

Figure 6:

FIG. 6 illustrates a uniform frequency carrier wave pulse as a uniform pitch diffractive grating. A constant-wavelength carrier wave pulse acts as a diffraction grating to couple light out of the TIR plate.

Figure 7:
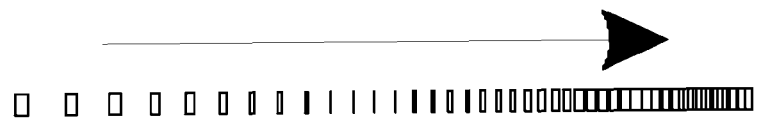

FIG. 7 illustrates a chirped variable frequency carrier wave pulse as a variable pitch diffractive grating. The chirped variable wavelength pulse is used to both couple light out of the curved TIR plate and collimate rays coupled by different portions of the pulse.

Figure 8:
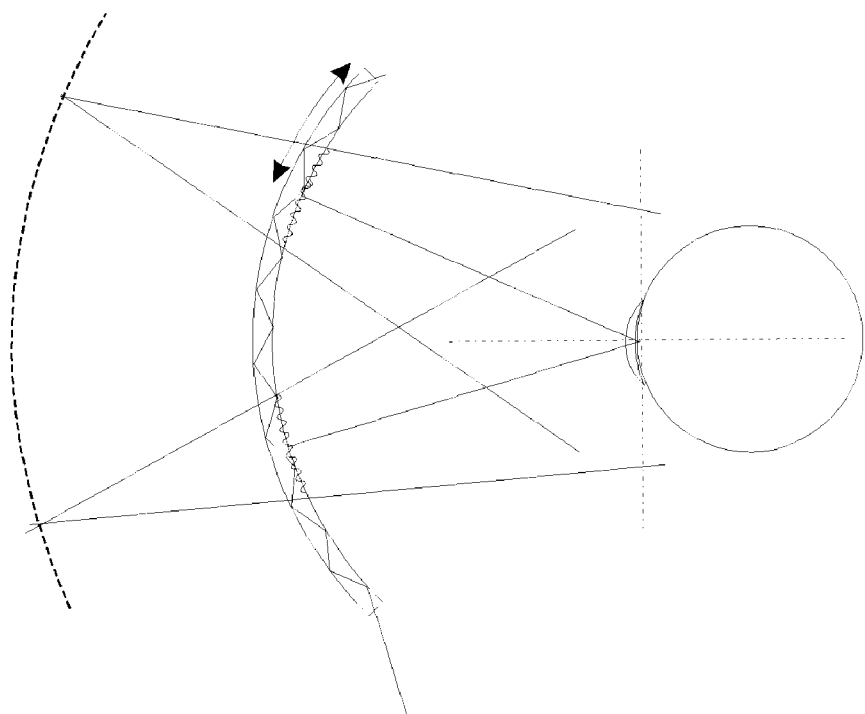

FIG. 8 illustrates a curved TIR plate with a variable pitch traveling wave chirped diffractive lens and shows how the position of the virtual image perceived by the user can be moved closer by changing the chirp pattern to produce a slightly diverging bundle of rays instead of parallel rays. The virtual image is moved closer (in one axis) by shortening the focal length of the traveling collimating lens. This can be used to relieve some kinds of eyestrain, and it can be used to correct for nearsightedness or farsightedness.

DETAILED DESCRIPTION OF THE INVENTION

Figure 1:
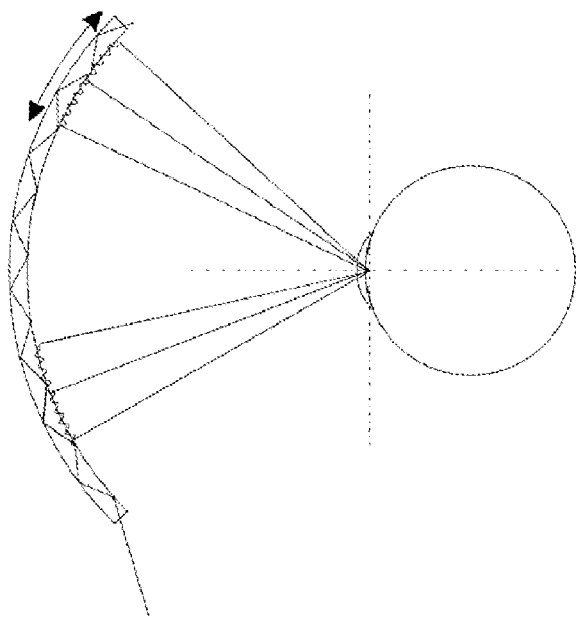

One version of the display using an acousto-optic traveling-wave lens employs a curved plate to guide a total internally reflected light wave. The light coupled out by a uniform acousto-optic traveling-wave lens emerges at a predetermined angle to the surface normal of the plate, the angle of which depends on the wavelength of the light, the TIR angle within the plate, and the wavelength of the acoustic wave. At one selected value of the acoustic wavelength, the light will be emitted normal to the surface of the plate, directly toward the center of curvature as shown in FIG. 1. As a result, all of the light converges to a line focus. For the purposes of the invention and those set forth in U.S. Pat. Nos. 6,181,367 and 5,973,727, this is not generally desirable because it would result in each pixel in the image being smeared vertically.

Figure 2:
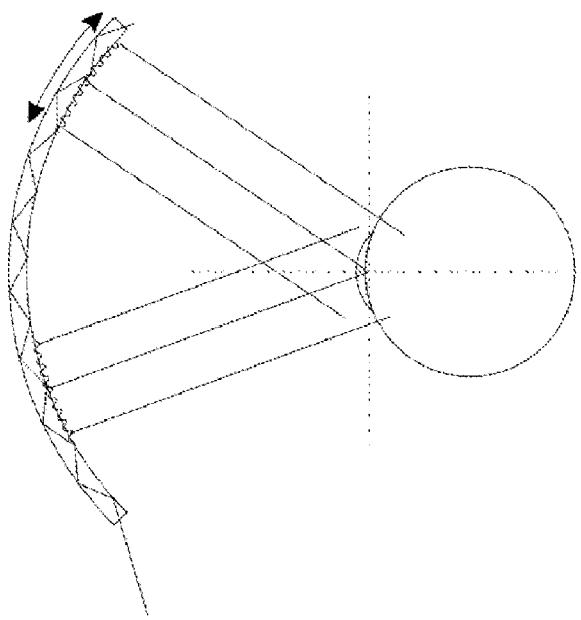

If, on the other hand, as shown in FIG. 2, the acoustic wave lens has the form of a short negative lens whose focal length is the negative of the radius of the plate's curvature, light instantaneously affected by the lens will emerge in a collimated beam whose center ray is directed to the center of curvature. As the lens travels around the curved plate, emerging light will be a collimated beam whose direction continuously changes so that its center ray is always directed to the center of curvature. Because collimated light (parallel rays) image to a point on the retina, the collimated light emerging from the traveling lens at any moment will be imaged to a line on the retina corresponding to a row of pixels in an image at infinity. In the next moment, the traveling lens will have moved a distance corresponding to one row separation, so the emerging light will then display the next row of image pixels at infinity, and so on. This is a behavior that can be effective for correcting the problems of the prior displays (including those of U.S. Pat. Nos. 6,181,367 and 5,973,727). The width of the lens substantially defines the vertical width of the eyebox.

The traveling wave lens is produced by a wave generator, preferably in the form of an acoustic wave generator, such as piezo-electric transducers known for this purpose. Drive signals can be provided by RF (e.g., ultra high frequency, UHF) drive signal interface circuitry. The traveling lens can overlap the intended space of multiple rows of information (e.g., 10 to 15 rows), but by collimating light across the space with the information intended for just one row, the information is presented to the viewer's eyes as a single row of information.

Another advantage of the acousto-optic traveling wave lens is that it makes the use of a liquid crystal layer unnecessary. The lens itself serves both to switch light out of the TIR mode and to direct the light to a focus at the eye. Thus, the LED line array that displays the rows of image pixels sequentially only needs to be synchronized with the motion of the traveling wave lens. A holographic optical element or other means can still be used to control the horizontal angle at which light proceeds to the user's eye. In particular, it is desirable to use a holographic optical element that, with respect to the horizontal direction, projects a virtual image of the LED array at infinity. The effective focal length of the holographic optical element is preferably dependent upon the vertical dimension, so that near the bottom edge of the display, the focal length is relatively short and near the top edge, the focal length is relatively long. This is important because the TIR light coupled out at each height behaves as if it was emitted by an LED array located at a different distance from the TIR plate, due to the multiple reflections inherent in the TIR process.

Design considerations for optimizing the application of the new display technology include:
1. Lower acoustic speed requires a lower acoustic frequency.
2. Increased diffraction efficiency makes more of the available light usable.
3. Lower power consumption is desirable, especially for portability.
4. Materials choices can affect acoustic wave speed, diffraction efficiency, and attenuation rate.
5. Minimizing attenuation rates is beneficial for enlarging device size.

Figure 3:
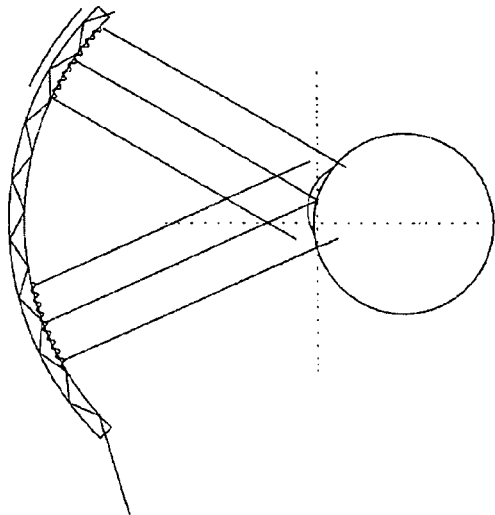
FIG. 3 illustrates a curved TIR plate with a variable pitch traveling wave chirped diffractive collimator lens as both a collimator and an eye tracker and shows how, by varying the carrier wave frequency, the pupil position can be moved up and down to track vertical eye rotation. The carrier wave frequency can be used to adjust the diffraction angle at the center for the pulse.
Figure 4:
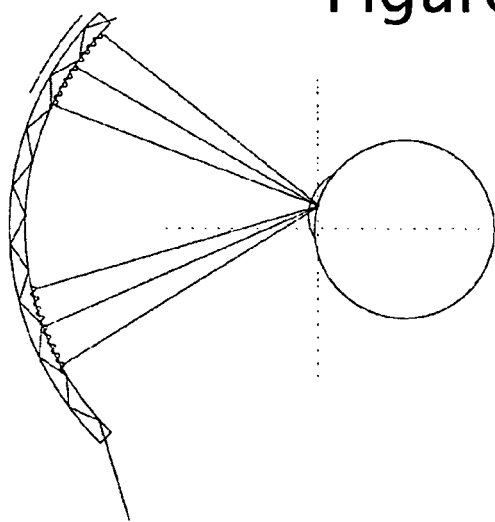
FIG. 4 illustrates a curved TIR plate with a uniform pitch traveling wave diffraction grating and shows how, by varying the frequency of the constant-wavelength acoustic wave pulse, the line focus can be moved vertically as a beam director. However, this arrangement would result in vertical blurring of image pixels.

The acoustic traveling wave lens can be used as an eye tracker, effectively increasing the eyebox height to any desired amount. This can be done either by offsetting the wavelength of a traveling collimator lens to displace the point where all the central rays cross as shown in FIG. 3, or by eliminating the collimator and simply using a uniform traveling grating and varying the pitch of the grating as shown in FIG. 4. In the second case, the instant eyebox is extremely small, but the effective eyebox is as large as desired. In both cases, of course, an eye orientation monitor is needed to detect the orientation of the eye, and some further control (e.g., processing) is needed make the necessary adjustments to the acoustic signal that generates the grating or diffractive lens. The eye monitor could also be arranged to detect the image on the retina of the viewer's eyes, and the traveling lens could be continuously controlled to adjust the focus of the system so that the viewer sees the sharpest possible image.

Since the displayed image only requires updating at a rate of approximately 30 times per second to avoid apparent flicker and the acoustic traveling wave lens traverses the TIR plate many times (e.g. 800 times) within that interval, the acoustic traveling wave lens can be varied between traverses so that the image presented for viewing represents a composite of the (partial or complete) image forms projected during each separate transverse of the traveling wave lens. For example, the lower 10 percent of the display could be addressed during the first 80 passes, the next 10 percent of the display could be addressed with a different traveling wave pulse during the second 80 passes, and so on until the entire display is addressed during a single refresh interval. In this way, the chirp of the traveling wave pulse could be varied as a function of the height of the display to provide similar focusing capabilities using a flat TIR plate. The image forming rays emitted from the plate could also be adjusted to compensate of astigmatism or other such aberrations in the viewer's eyes.

A custom display can also be made by adjusting the acoustic signal that generates a diffractive traveling lens to compensate for vision defects, in order to produce a more nearly perfect perceived image. This could be accomplished by first measuring the vision defects using standard opticians' methods or using a Shack-Hartmann wavefront analyzer, then calculating and applying the necessary corrections to the acoustic signal.

Although the TIR plate is intended as a waveguide, the plate can still be transparent. The grating pitch produced by the acoustic wave is so high that the grating can be arranged to affect only total internally reflected light and have no significant effect on light passing through the plate. If the traveling lens or beam steerer is "on" at each row in the display only part of the time, then the display can be effectively a window or eyeglass lens most of the time. Thus, the display can be truly see-through. Some acousto-optic devices use a conductive layer, so a see-through display in that case would require use of a transparent conductor, such as indium tin oxide, rather than an opaque metallic conductor.

The preferred TIR plate has an overall cylindrical shape but could be made in other shapes, including planar, for particular purposes, including spherical or aspherical shapes. For example, light could be launched into the plate from a wider range of angles. A wide viewing angle display can provide for more of a so-called "total immersion" experience.

If an acoustic traveling lens is used, then by varying the physical properties of the acoustic propagation medium, e.g., the TIR plate, such as its material density, tension or compression, overlying layers of material or their thicknesses along the propagation path of the acoustic wave, it is possible to cause the wavelength of the acoustic wave to vary in a predetermined way as it progresses. This may be useful for example in making a flat display on which the acoustically generated carrier wave pitch varies with position across the plate, and on which the acoustically generated collimating lens focal length also varies with position across the plate. Reducing the carrier wave pitch results in the light emerging from the TIR plate into a more extremely deflected angle. Shrinking the chirped acoustic pattern results in shortening the focal length of the generated lens.

Among its preferred forms the invention includes a linear array of light sources arranged for expressing individual raster rows of information that collectively reproduce a two-dimensional image array. A controller regulates the output of the light sources to propagate a succession of raster rows for reproducing the two-dimensional image array within the integration interval of the human eye. A waveguide, preferably in the form of a TIR plate has front and back surfaces for propagating light beams by total internal reflection. A beam injector, such as a diffraction grating mounted on the front or back surface of the TIR plate, injects the light beams from the linear array of light sources into the waveguide.

The injected light beams are preferably collimated and angularly oriented within vertical planes for internally reflecting from the front and back surfaces of the waveguide at predetermined angles, thereby achieving repeated encounters with the front surface of the waveguide. Light emanating from each light source is collimated in a slightly different direction within a horizontal plane that includes the linear array corresponding to the lateral offset of the individual light sources from the center of the collimating optic. However, light emanating from each light source is collimated in substantially the same direction within a vertical plane. The collimated beam dimensions associated with the individual light sources can be varied between the horizontal and vertical planes by separately collimating the beams in the horizontal and vertical planes at different points along a diverging beam path to the beam injector. The beam injector can collectively redirect the beams within the vertical plane to set the direction at which the beams enter the TIR plate for reflecting from the front and back surfaces of the TIR plate.

Various means are provided for allowing the injected beams to escape through the front surface of the waveguide. The same or different means, including a traveling lens, are provided for directing the light beams associated with each raster row of light toward an eyebox (a viewing zone located at a distance from the front surface of the waveguide) at different vertical angles corresponding to the intended vertical positions of the raster rows within the two-dimensional image array. Despite the slightly different directions at which the light beams propagate in the horizontal plane, each of the light beams is preferably wide enough in the horizontal plane to fill the eyebox. Each raster row or information emitted by the linear array of light sources can project from the same or different portions of the front surface of the plate. For most efficiency, each raster row projects from a slightly different but overlapping horizontal band so that the projected light fills the eyebox at each different angular orientation of the individual raster rows while limiting the vertical dimensions of the collimated beams. Thus, the vertical position at which light escapes from the TIR plate is preferably timed with the different raster row emissions so that each raster row projects from a desired horizontal band of the TIR plate in a desired angular orientation.

Among the choices for the linear array of light sources is an array of LEDs or VECSELs, or a single laser spread into a line of liquid crystal modulators. The preferred intention is to create a linear array of monochromatic point sources. For color display, three separate rows of linear arrays of emitters can be used. The emitter arrays can be powered by a driver to reproduce one raster row of an image at a time. Preferably, the light sources would be updated at a rate of 60 cycles per second. The three color arrays, red, green, blue, can be operated simultaneously or in succession. If simultaneously, subsequent adjustments would be required to account for the different spectral dispersion effects through the subsequent optics of the video display.

The preferred purpose of the beam injector is to orient the light beams for injection into the waveguide (TIR plate) at a desired common vertical angle to support reflections from the front and back surfaces of the plate. According to a preferred embodiment, a cylindrical lens having a horizontal axis aligned with the emitter array is located close to the emitter array for vertically collimating the light beams at a relatively narrow common height. Farther along is a second cylindrical lens having a vertical axis that collimates the light beams in a horizontal direction. The vertical collimator collimates all of the beams from the different light sources in a common direction. That is, the horizontal axis of the vertically collimating cylindrical lens is preferably aligned with the array of point sources (emitter array). However, the point sources in the emitter array approach the vertical axis of the horizontally collimating cylindrical lens from different directions. As a result, each of the point sources is collimated in a slightly different direction, i.e., an extension of the direction at which the point sources intersect the vertical axis of the horizontally collimating cylindrical lens. Since the horizontally collimating lens is farther from the point sources than the vertically collimating lens, the collimated beams are much wider than they are in height.

An alternative embodiment uses a single holographic optical element to shape the beams in two dimensions. The holographic element can be the equivalent of a spherical lens and can have the effect of collimating the beams from the different light sources with substantially equal vertical and horizontal dimensions. All of the beams would still be vertically collimated in the same plane and would still be horizontally collimated in different directions depending upon the angular displacement of the point sources from the optical axis of the spherical lens. The spherical lens would be useful in embodiments in which more vertical height is needed.

The beam injector is preferably a diffraction grating that diffracts the so-shaped beams into a TIR plate (a total internally reflecting plate), as a preferred form of waveguide. The light beams are preferably injected so as to propagate by internal reflection from the front and back surfaces of the plate at an incidence angle of approximately 70 degrees.

The TIR plate can be made of just about any relatively efficiently transmitting optical material. However, the refractive index of the TIR plate is preferably set relative to other components to achieve a desired switching function. For example, the TIR plate can be made of glass having a refractive index of 1.5 or 1.6. The injected light can have a nominal wavelength of 650 nanometers. Returning again to the beam injector, the grating can have a linear grating with a pitch of 456 nanometers. Presumably, the light approaches the diffraction grating at near normal incidence with respect to the vertical plane and is bent relative to the vertical direction upon entering the TIR plate. The thickness of the TIR plate is set in relation to the vertical height of the beams such that each subsequent reflection presents the beam to the front surface of the plate in a substantially uninterrupted sequence. In other words, the top end of the beam impinging on the front surface from one reflection slightly overlaps or is at least closely adjacent to the bottom end of the vertical height of the beam impinging on an adjacent section of the front surface of the TIR plate. Thus, some portion of the light beam from each point source reflects without interruption along a vertical line of the TIR plate. In an alternative embodiment, the plate is made thicker, and beams with a larger vertical height dimension are used so that the entire working area of the TIR plate is filled upon a single reflection cycle of the light.

The front surface of the TIR plate can be covered with a number of layers, comprising a light switch. First, can be an electrode layer having a refractive index significantly higher than the underlying glass followed by a polymer layer for orienting liquid crystals, and a liquid crystal layer itself followed by what may be another polymer layer, and a second electrode layer of indium tin oxide. The liquid crystal layer preferably has a refractive index in one mode that approximately matches the optical index of the underlying glass and in another mode has a refractive index that is substantially lower. Actually, the normal state of the liquid crystal itself could be a little lower as long as it is above a threshold required for otherwise maintaining total internal reflection. When the electrodes are powered and the liquid crystal is reoriented, its refractive index drops and the layer no longer supports total internal reflection. Instead, the light is propagated onward through a cover layer to a diffraction grating that releases light from the TIR plate. The ejected light is still collimated both vertically and horizontally with the horizontal orientations varying with the offset positions of the light sources. The collimating effects cause the point sources to be viewed at a significant distance away. To adjust the horizontal viewing angle either the length of the emitter array can be varied, or its distance from the collimating lens. The horizontal resolution is fixed by the number of point sources in the array.

The liquid crystal, which preferably supports the switching function that changes the TIR plate from total internal reflection to transmission can have what is called an ordinary and extraordinary refractive index. As the extraordinary refractive index is presumed higher than the ordinary refractive index, the extraordinary refractive index supports the function of total internal reflection and the ordinary refractive index allows light to escape.

According to another embodiment, there are but two electrodes and one switch, which controls whether the light reflects within the TIR plate for projects from the TIR plate without particular regard for the position of the light beams along the vertical dimension of the TIR plate. However, in a more preferred embodiment, the electrodes of at least the upper or lower layer are arranged in rows so that the position at which light is released from the display can be controlled. The electrodes can have relatively gaps between them filled with an index matching material so that there is no optical effect by the breaks between electrodes.

If the beams are wide enough in the vertical direction, the switching function could be eliminated entirely. To shut the display off, the light emitters could be turned off. Thus, on one of the more elemental designs, there would be a wide vertical dimension to the beam and no switch.

So far, the light released from the display, whether by switch or not, is released in a single vertical direction but in a range of collimated horizontal directions representing the offsets of the point sources in the horizontal direction. To provide a two dimensional or more display, it is necessary to change the vertical angles of the beams as the information within the LEDs is updated to the next raster row of information. For example, if a viewing angle of 60° were set along with an intended 600 line resolution, then the vertical angle would need to be adjusted through $\frac{1}{10}^{th}$ of a degree for each new row of information. Thus, the viewing angle in the vertical direction is set by the range of angular displacement of the beams, which contrast with the horizontal viewing angle that is set by the angular spacing of the light sources in the horizontal direction and further controlled by the length of the display and its distance from the horizontal collimating lens. The vertical resolution is affected by how many angular changes are accommodated within each vertical sweep of the display, which can occur at a rate of 60 cycles/second.

According to a preferred embodiment, an exit direction grating or holographic optical element directs the light in a single vertical direction that is preferably slightly away from the eyebox. The beam steering element can be the equivalent of a variable angle prism such that each row of information is directed to a different angle. Preferably, the optical switch and the controllable prism are operated in synchronism such that the light is released from an appropriate vertical height of the display for orienting the beam at a particular angle that will reach the eyebox. Of course, if the beam is wide enough in the vertical dimension, it will reach the eyebox with less regard to its vertical position along the display. The prism is preferably of the Fresnel type and includes electrodes having the effect of varying the prism angle. The prism could thus be made of a liquid crystal material.

As a single layer device, the prism would be required to be quite thick, and as a result, this could significantly slow its response time. One possible solution is the use of two Fresnel prisms that face one another and are mechanically rotated in opposite directions (i.e., counter-rotated) to have the effect of changing the vertical angle at which the light is propagated from the TIR plate. This, of course, has the disadvantage of requiring mechanical instead of electrical components. Another approach is to use the holographic optical element or perhaps even the TIR plate itself to focus the light beams toward the eyebox and then use a traveling negative lens to re-collimate the light at different vertical heights along the plate.

A traveling lens can function as both a light switch for projecting light beams representing raster rows from different zones of the TIR plate and as a beam steerer for vertically orienting the light beams representing the different raster rows at different vertical angles. Details of the preferred traveling lenses are discussed above.

Although described with respect to a limited number of embodiments those of skill in the art will appreciate the wide range of possible applications of the traveling wave concept relating to dynamically controlling the shape of a light beam. For example, the invention could be applied to make adaptive eyeglasses that would correct anyone's vision to better than 20/20 for purposes of viewing a display or even viewing the real world. The same eyeglasses could be worn by people with different prescriptions, because the prescriptions would be determined by software instead of by the shape of a piece of glass or plastic.

The invention claimed is:

1. A video display comprising:
   a light signal generator that generates modulated light signals containing video information,
   a plate that propagates the light signals by internal reflection along an optical guideway,
   a light-releasing mechanism to release light from the optical guideway in a timed relationship with the modulation of the light signals
   a traveling lens that propagates in communication with the optical guideway for guiding light released from the optical guideway into selected directions in a timed relationship with the modulation of the light signals.

2. The video display of claim 1 further comprising:
   a wave generator that generates a traveling acoustic wave to serve as a traveling lens, propagating in communication with the optical guideway for releasing light from the optical guideway in a timed relationship with the modulation of the light signals.

3. The display of claim 1 in which the traveling lens is a liquid crystal device.

4. The display of claim 1 in which the traveling lens has a finite focal length.

5. The display of claim 1 in which the traveling lens has an effectively infinite focal length.

6. The display of claim 2 in which the traveling acoustic wave releases light in directions influenced by the form of the traveling pressure wave.

7. The display of claim 3 in which the traveling acoustic wave is a variable pitch traveling wave.

8. The display of claim 7 in which the variable pitch traveling wave functions as a chirped diffractive grating lens.

9. The display of claim 8 in which the variable pitch traveling wave provides a vision correction for viewing the display.

10. The display of claim 1 in which the plate is curved to contribute focusing power.

11. The display of claim 1 further comprising an eye tracker and a control system for modifying the form of the traveling lens to accommodate changes in eye orientation.

* * * * *